US005443240A

United States Patent [19]

Cunningham

[11] Patent Number: 5,443,240

[45] Date of Patent: Aug. 22, 1995

[54] MOUNTING MEANS FOR VIBRATION MEMBER

[75] Inventor: Patrick M. Cunningham, Beacon Falls, Conn.

[73] Assignee: Branson Ultrasonics Corporation, Danbury, Conn.

[21] Appl. No.: 194,108

[22] Filed: Feb. 9, 1994

[51] Int. Cl.[6] .......... F16M 3/00

[52] U.S. Cl. .......... 248/638; 228/11; 248/568; 310/345

[58] Field of Search .......... 310/322, 323, 345, 26; 156/73.1; 228/1.1; 248/638, 676, 637, 568, 569

[56] References Cited

U.S. PATENT DOCUMENTS

| | | | |
|---|---|---|---|
| 2,891,178 | 8/1957 | Elmore | 310/26 |
| 2,891,179 | 8/1957 | Elmore | 310/26 |
| 2,891,180 | 8/1957 | Elmore | 310/26 |
| 3,752,380 | 3/1972 | Shoh | 228/1.1 |
| 4,647,336 | 3/1987 | Coenen | 156/580 |

OTHER PUBLICATIONS

Ultrasonic Engineering, pp. 89–103 Julian R. Frederick.
Starrer-Booster 20 kHz "Gold" Branson Drawing.
Telsonic Boostie Design-Drawing.

*Primary Examiner*—Ramon O. Ramirez
*Attorney, Agent, or Firm*—Polster, Lieder, Woodruff & Lucchesi

[57] ABSTRACT

Mounting means for a vibratory member, such as an elongate half wavelength resonator, include a pair of cylindrical tubes, each tube coupled with one end to the nodal region of the member and the other end of each tube coupled to a stationary clamping means disposed about the member. The axial length and the thickness of the tubes are selected to enable the tubes to flex radially responsive to the substantially radial vibrations manifest at the nodal region of the member, whereby to decouple the vibrations of the member from the stationary clamping means.

7 Claims, 3 Drawing Sheets

STACK POWER LOSS VS. AXIAL LOAD

DEFLECTION VS. AXIAL LOAD

MOUNTING MEANS FOR VIBRATION MEMBER

BACKGROUND OF THE INVENTION

This invention relates to mounting means for high frequency vibration members and, more specifically, refers to mounting means for solid resonators, also known as mechanical impedance transformers, sonotrodes, horns, tools, concentrators, couplers and the like, used for coupling high frequency vibrations in the sonic or ultrasonic frequency range to a workpiece. The vibrations are used for joining thermoplastic parts, welding metal parts, abrasive slurry machining of glass or ceramic workpieces and the like. The construction and use of these vibration members is well known and fully described in "Ultrasonic Engineering" (book) by Julian R. Frederick, John Wiley & Sons, New York, N.Y. (1965), pp. 89–103.

The mounting means for a vibration member must be designed to substantially decouple the vibrations of the vibration member, which, when operative, is resonant as a one-half wavelength resonator for high frequency vibrations of predetermined frequency traveling longitudinally therethrough, from the mounting means without impairing the operation of the vibration member. Absent such decoupling, there is a loss of vibratory energy and the transmission of vibrations to mounting means and to other parts of a machine where the existence of vibrations is highly undesirable.

Mounting the vibration member to a stationary support is effected most commonly by providing support means which engage the vibration member at a nodal region or an antinodal region present in the vibration member when the high frequency vibrations are transmitted through the member along its longitudinal axis from a radially disposed input surface at one end to a radially disposed output surface at the other end. Under those conditions and assuming a one-half wavelength resonator, there exists an antinodal region of the vibrations at the input surface and at the output surface, and a nodal region of the vibrations will be present at a region medially between the antinodal regions, the precise location of the nodal region being dependent on the mechanical configuration of the resonator. At the nodal region the vibrations appear as substantially radially directed vibrations.

Mounting means using flexible metallic elements engaging a vibration member at antinodal regions of the vibrations have been disclosed, for instance, in U.S. Pat. No. 3,752,380 entitled "Vibratory Welding Apparatus" issued to A. Shoh, dated Aug. 14, 1973. The disadvantage of that arrangement resides in the fact that the vibration member must be at least one full wavelength long.

Other mounting means coupled to a vibration member are shown in U.S. Pat. Nos. 2,891,178, 2,891,179 and 2,891,180 entitled "Support for Vibratory Devices", issued to W. C. Elmore, dated Jun. 16, 1959. These patents disclose various decoupling means engaging the vibration member at an antinodal region. The decoupling means comprise tuned elements one-quarter or one-half wavelength long. These mounts, because of their complexity and space requirements, have not found wide acceptance and are rarely present in commercial apparatus.

As a result of the above stated shortcomings, several mounts have been developed which support the vibration member at its nodal region. One current design, in wide use, provides the vibration member with a thin flange which protrudes radially from the nodal region of the vibration member. Elastomer "O"-rings are disposed on either side of the flange, all enclosed in a two-piece metallic annular ring, see U.S. Pat. No. 4,647,336 issued to J. D. Coener et al, dated Mar. 3, 1987. The elastomer "O"-rings serve to dampen the vibrations present at the nodal region of the vibration member with respect to the annular ring, which, in turn, is held stationary in a housing. However, this construction, although widely used, has several inherent problems. The "O"-rings are subject to wear and the elastic rings fail to provide the desired degree of rigidity for the vibration member in precision applications, specifically, the vibration member is subject to movement responsive to an axial or lateral force.

In order to overcome the above stated problem, metallic nodal mounts have been developed which provide greater rigidity. However, the designs now in use exhibit significant disadvantages in one design, the vibration member and the metallic decoupling flange are made from a single piece of material, requiring intricate and expensive machining operations. Another design uses a single "L"-shaped decoupling flange which also is machined from bar stock and occupies a rather large amount of space.

BRIEF SUMMARY OF THE INVENTION

The present invention discloses a compact and simple metallic mounting means for a vibration member. The vibration member is provided at its nodal region with a radially extending cylindrical flange. Clamping means surround the vibration member. A pair of cylindrical flexure tubes is provided, each tube secured by a press fit with one of its ends to one respective side of the flange, and the other end of such tube secured by a press fit to the clamping means, which comprises two halves axially secured to one another. Additionally, both clamping halves have respective radial surfaces for urging each tube against a respective seating surface disposed on the flange. The cylindrical tubes have a wall thickness and axial length dimensioned for enabling the tubes to flex radially as the vibration member undergoes its radial vibrations in the nodal region. Therefore, the tubes decouple the vibrations of the member from the clamping means which are supported in a stationary housing.

One of the principal objects of this invention is the provision of a new and improved mounting means for a vibration member.

Another principal object of this invention is the provision of a new and improved solid mounting means for a vibration member, specifically a vibration member adapted to be resonant as a one-half wavelength resonator.

Another important object of this invention is the provision of a metallic mounting means coupled to a vibration member at its nodal region, the member exhibiting such nodal region when rendered resonant at a predetermined frequency.

A further object of this invention is the provision of a mounting means for a vibratory member adapted to be resonant as a one-half wavelength resonator, the mounting means including a pair of cylindrical tubes for decoupling the vibrations manifest at the nodal region of the member from substantially stationary clamping means surrounding the vibratory member.

Another and further object of this invention is the provision of a metallic and solid mounting means for a vibration member engaging such member at its nodal region, the mounting means being characterized by simplicity of construction and low cost.

Still another and further object of this invention is the provision of a nodal mount for a vibration member, the mount exhibiting greater rigidity and having a lower power loss than prior art means using elastic rings for decoupling vibrations.

Further and still other objects of this invention will become more clearly apparent from the following description when taken in conjunction with the accompanying drawings.

DESCRIPTION OF THE INVENTION

The mounting means described hereafter is particularly suited for mounting an elongated resonator, dimensioned to be resonant as a one-half wavelength resonator when high frequency vibrations of predetermined frequency traverse such resonator longitudinally, at its nodal region of longitudinal vibrations. In a typical industrial apparatus, the predetermined frequency is in the ultrasonic range, for instance 20 kHz, and the apparatus includes a stack of three vibration members, namely an electroacoustic converter for converting applied electrical high frequency energy to mechanical vibrations, an intermediate coupler, also known as "booster horn", for receiving the vibrations from the converter and coupling them at the same amplitude or increased amplitude to an output horn, tool, sonotrode, etc., which couples the vibrations to a workpiece. In order to be operative, all members of the stack are dimensioned to be resonant at the predetermined frequency. The booster horn, aside from functioning as a mechanical impedance transformer, also serves in most cases as a means for supporting the stack in a stationary housing. The following description describes the mounting means in connection with a booster horn, although the invention is applicable also to other vibration members of a similar nature.

Figure 1:
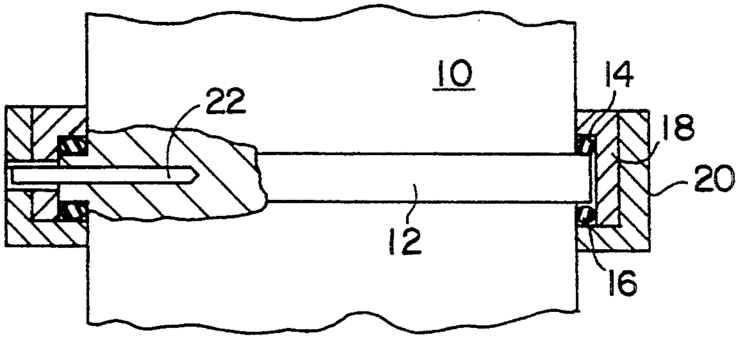
FIG. 1 PRIOR ART
FIG. 1 is an elevational view, partly in section, of a typical prior art mounting means in wide use.

Referring now to the figures and FIG. 1 in particular, there is shown the widely used prior art mounting means. Numeral 10 denotes the body of a typical booster horn, made from aluminum or titanium, which is provided at its nodal region of longitudinal vibrations with a radially extending flange 12. Elastomer "O" -rings 14 and 16 are provided, one ring on either side of the flange 12, and both the rings and the flange are enclosed within a set of "L" -shaped annular metal rings 18 and 20 which are secured to one another by a set of radial pins 22. The elastomer rings serve to decouple the vibrations of the vibration member (booster horn) from the surrounding support rings 18 and 20 which, in turn, are inserted into and supported by a circular groove disposed in a larger housing, not shown.

It will be apparent that the prior art mounting means has inherent disadvantages with respect to stack rigidity arising from the elasticity of the "O" -rings, and that the latter rings are subject to aging and wear due to the dissipation of vibratory energy.

Figure 2:
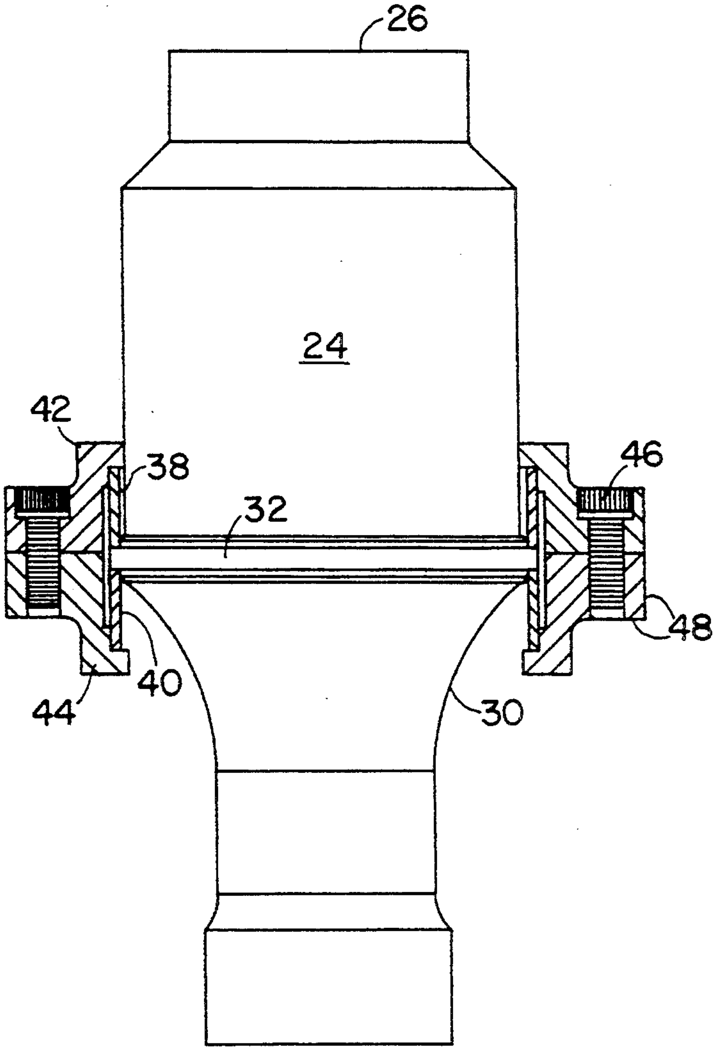
FIG. 2 is an elevational view, partly in section, of the improved mounting means forming the present invention.
Figure 3:
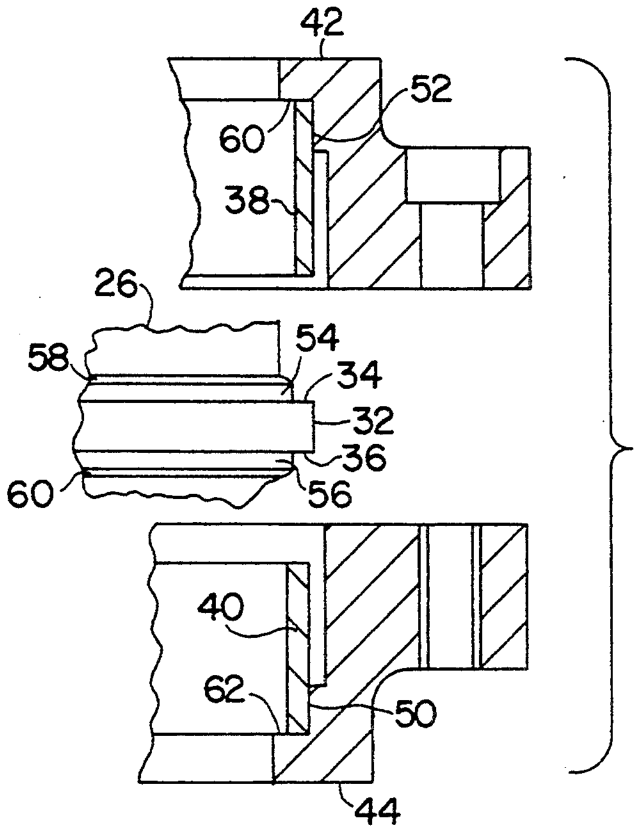
FIG. 3 is an exploded view of parts shown in FIG. 2.

The improved, so-called rigid, nodal mount design is shown in FIGS. 2 and 3. The booster horn 24, an elongated round body, is provided with a radially disposed input surface 26 for being mechanically coupled to the output surface of an electroacoustic converter for receiving mechanical high frequency vibrations therefrom. The opposite radially disposed output surface 28 provides the vibrations to the input surface of a horn which, in turn, transmits the vibrations to a workpiece, see Frederick supra. The booster horn depicted has a gain section, generally identified by numeral 30, for acting as a mechanical amplifier for the vibrations transmitted therethrough from the input surface 26 to the output surface 28.

When vibrations of the predetermined frequency are transmitted, the booster horn is rendered resonant as a one-half wavelength resonator and a nodal region of such vibrations is manifest about medially between the antinodal regions present at the input surface and output surface, respectively. As stated heretofore, the precise location of the nodal region is dependent upon the configuration of the horn. As shown in FIG. 2, an annular flange 32 protrudes radially from the nodal region of the horn. Each side of the flange 32 is provided with identical seating means 34 and 36 for receiving thereupon one end of a respective flexure tube 38 and 40. The other end of each tube is seated in a respective half of clamping means 42 and 44. A set of screws 46 secures the clamp halves to one another. The outer surfaces 48 of the clamp means are configured for being mounted within a circular groove of a larger housing, which thereby supports the member or a stack of resonators.

The distal ends of the tubes 38, 40 have a press fit with the respective cylindrical surfaces 50 and 52 of the clamp halves, see FIG. 3. The seating means 34 and 36 are of an "L" shaped configuration. The cylindrical axially disposed surfaces 54 and 56 of the seating means are dimensioned to provide a press fit with the proximate ends of the tubes 38 and 40. In order to effect the press fit, respective chamfered surfaces 58 and 60 are disposed on each side of the flange 32 for guiding the tubes upon the surfaces 54 and 56.

The mounting means are assembled by pressing one end of a respective tube into one end of the clamping halves 42 and 44. As stated, a press fit exists by virtue of surfaces 50 and 52 being machined to have a slightly smaller inside diameter than the outside diameter of the tubes. The clamp halves with tubes firmly pressed therein are then placed about the booster horn, see FIG. 3, and closed upon one another by tightening screws 46. The proximate ends of the tubes 38 and 40 are guided over the respective chamfered surfaces 58 and 60, and pressed upon the abutting axial surfaces 54 and 56, which have a slightly larger diameter than the inside diameter of the tubes 38 and 40. The radial surfaces 60 and 62 of the respective clamp halves cause a force upon the associated tube, and as the screws are tightened, the tubes are urged to slide over the chamfered surfaces, the abutting cylindrical surfaces and onto the radial surfaces of the seating means 34 and 36.

As a result of the press fit, the proximate ends of the tubes are inhibited from undergoing relative motion with respect to the flange, and the distal ends are inhibited from undergoing relative motion with respect to the clamping means. The tubes, in a typical case, are made from aluminum and have an axial length and wall thickness dimensioned to flex or yield radially for decoupling the vibrations manifest in the nodal region of the member from the substantially stationary clamping means. In a typical embodiment where the horn is dimensioned to be resonant at the ultrasonic frequency of 20 kHz, each tube has an axial length of 11.43 mm, an outer diameter of 55.4 mm, and a wall thickness of 1.29 mm. As is evident from FIGS. 2 and 3, there is sufficient clearance between the midsection of the tubes and the clamping means to enable the tubes to flex radially as is required by the radial motion of the horn at its nodal region, thus effecting decoupling of the booster horn vibrations from the stationary clamping means.

The present construction has the advantage of simplicity. Importantly, however, the improved mount per FIG. 2 fits mechanically into the same housing as the prior art design per FIG. 1. Therefore, there exists the capability of interchanging assemblies, which feature is of significance in obtaining improved performance from currrently installed equipment.

Figure 4:
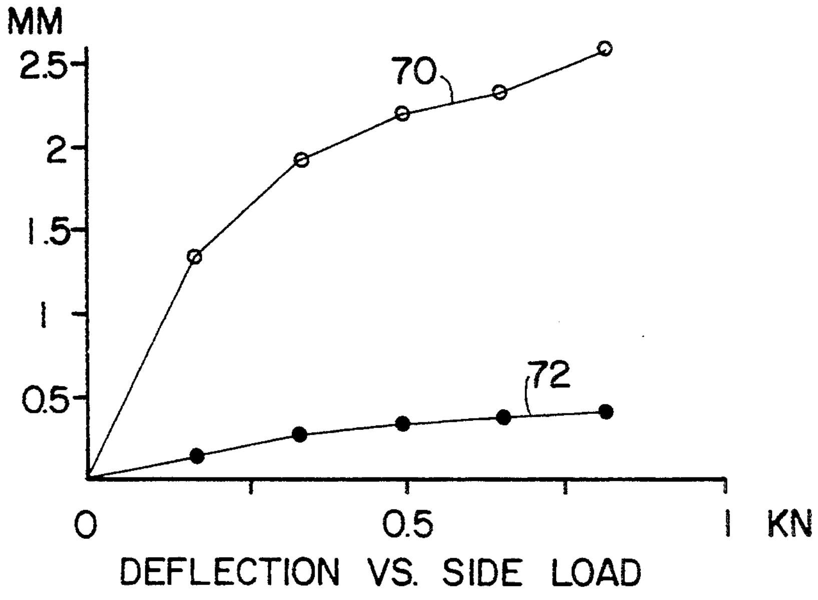
FIG. 4 is a graph showing deflection vs. side load for the prior art design per FIG. 1 and the improved mount depicted in FIG. 2.
Figure 5:
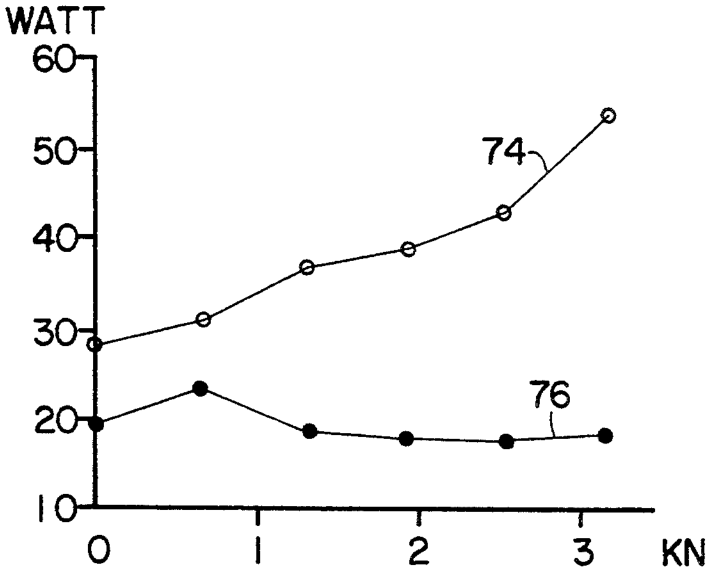
FIG. 5, is a graph showing stack power loss vs. axial load for the prior art mount and the improved mount.
Figure 6:
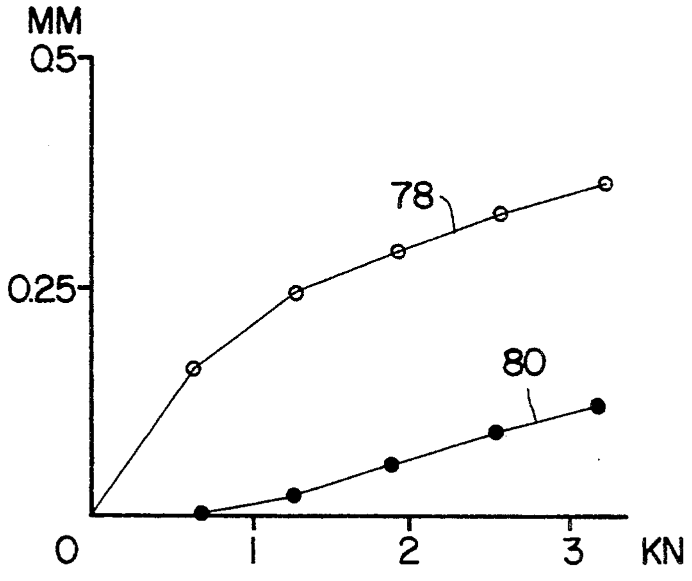
FIG. 6 is a graph showing deflection vs. axial load for the prior art mount and the improved nodal mount construction disclosed herein.

FIGS. 4, 5 and 6 depict the improved results obtained by the new mounting means disclosed heretofore. FIG. 4 shows the measurement on a stack as described heretofore of lateral deflection vs. side load. The deflection is measured in millimeters at the median or nodal area of an output horn and the load is measured in kilonewtons. Curve 70 shows the "O" -ring assembly per FIG. 1, whereas curve 72 shows the greatly reduced deflection achieved with the solid mount construction per FIG. 2. FIG. 5 shows the stack electrical power loss vs. axial load. Curve 74 represents the measurements on the elastomer ring construction while curve 76 shows the much reduced power loss of the design per FIG. 2. The large power loss per curve 74 is primarily due to an increase in stiffness of the "O" -rings. FIG. 6 depicts the deflection versus axial load. Once again, curve 78 relates to the resilient mount design, whereas curve 80 applies to the solid mount design shown in FIG. 2. In all instances, the improvement achieved is significant.

While there has been described and illustrated a preferred embodiment of the present invention, it will be apparent to those skilled in the art that various changes and modifications may be made without departing from the principle of the invention, which shall be limited only by the scope of the appended claims.

What is claimed is:

1. Mounting means for an elongated substantially cylindrical vibration member dimensioned to be resonant as a one-half wavelength resonator for vibrations of predetermined frequency traveling longitudinally therethrough, and when resonant exhibiting two respective antinodal regions and a nodal region of said vibrations, the improvement comprising:

flange means of substantially cylindrical cross-section radially extending from said vibration member substantially at said nodal region, and said flange means including seating means for receiving at either side of said flange means one end of a respective flexure tube and for tightly engaging such one end of each tube for inhibiting relative motion between said one end of each tube and said member;

a pair of metallic flexure tubes, one tube disposed on said seating means on one side of said flange means and the other tube disposed on said seating means on the other side of said flange means, and said tubes extending substantially axially and concentrically about said member;

annularly shaped clamping means disposed for engaging the other end of each of said tubes and including first surface means for tightly engaging such other end of each of said tubes for inhibiting radial motion of said other ends relative to said clamping means, and having second surface means for providing an axial engagement force between said tubes and said seating means;

said tubes having an axial length and a wall thickness dimensioned for enabling each tube to flex radially responsive to said member being resonant and thereby undergoing substantially radial motion at its nodal region, whereby to decouple the vibrations of said member from said clamping means.

2. A mounting means for an elongated substantially cylindrical vibration member as set forth in claim 1, said flexure tubes being of cylindrical shape.

3. Mounting means for an elongated substantially cylindrical vibration member as set forth in claim 2, said seating means including an axially extending surface on either side of said radially extending flange means for receiving thereupon by means of a press fit said one end of a respective one of said tubes, said first surface means of said clamping means comprising a pair of axially directed surfaces, each for providing a press fit with said other end of a respective tube, and said second surface means comprising radially disposed surface means for engaging each of said tubes at the respective other end for providing the axial engagement force between said tubes and said seating means.

4. Mounting means for an elongated substantially cylindrical vibration member as set forth in claim 2, said clamping means comprising two substantially annular clamp halves, and fastening means for securing said halves to one another axially.

5. Mounting means for an elongated substantially cylindrical vibration member as set forth in claim 4, said clamping means including outer surfaces configured for enabling said clamp means to be inserted in a groove of a housing.

6. Mounting means for an elongated substantially cylindrical vibration member as set forth in claim 1, said member being dimensioned to operate at a predetermined frequency in the ultrasonic frequency range.

7. Mounting means for an elongated substantially cylindrical vibration member as set forth in claim 1, said tubes being aluminum.

* * * * *